US010230180B2

(12) United States Patent
Nishida et al.

(10) Patent No.: US 10,230,180 B2
(45) Date of Patent: Mar. 12, 2019

(54) CONNECTING COMPONENT MATERIAL

(71) Applicant: NISSHIN STEEL CO., LTD., Tokyo (JP)

(72) Inventors: Yoshikatsu Nishida, Osaka (JP); Masashi Hiraoka, Osaka (JP); Masao Nagao, Osaka (JP); Masayoshi Tatano, Osaka (JP); Takahiro Fujii, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 132 days.

(21) Appl. No.: 15/312,429

(22) PCT Filed: Apr. 23, 2015

(86) PCT No.: PCT/JP2015/062385
§ 371 (c)(1),
(2) Date: Nov. 18, 2016

(87) PCT Pub. No.: WO2015/178156
PCT Pub. Date: Nov. 26, 2015

(65) Prior Publication Data

US 2017/0085014 A1 Mar. 23, 2017

(30) Foreign Application Priority Data

May 19, 2014 (JP) ................................ 2014-103080

(51) Int. Cl.

| | |
|---|---|
| ***B32B 3/00*** | (2006.01) |
| ***H01R 4/62*** | (2006.01) |
| ***C25D 5/12*** | (2006.01) |
| ***C25D 7/00*** | (2006.01) |
| ***H01R 13/03*** | (2006.01) |

(52) U.S. Cl.
CPC ................. *H01R 4/62* (2013.01); *C25D 5/12* (2013.01); *C25D 7/00* (2013.01); *H01R 13/03* (2013.01); *Y10T 428/12472* (2015.01)

(58) Field of Classification Search
CPC ............................................. Y10T 428/12472
USPC ......................................................... 428/612
See application file for complete search history.

(56) References Cited

U.S. PATENT DOCUMENTS

| | | | |
|---|---|---|---|
| 2008/0257581 | A1 | 10/2008 | Masago et al. |
| 2010/0163277 | A1 | 7/2010 | Masago et al. |

FOREIGN PATENT DOCUMENTS

| | | | |
|---|---|---|---|
| JP | 2004-300489 | A | 10/2004 |
| JP | 2007-258156 | A | 10/2007 |
| JP | 2008-269999 | A | 11/2008 |
| JP | 2011-204617 | A | 10/2011 |

OTHER PUBLICATIONS

Dietzsch et al., "The MOTIF-method (ISO 12085)—a suitable description for functional, manufactural and metrological requirements", 1998, Int. J. Mach. Tools Manufact., vol. 38, pp. 625-632.*
International Organization for Standardization, "ISO 12085:1996", ISO, https://www.iso.org/standard/20867.html accessed Jun. 15, 2017, pp. 1-2.*
International Search Report dated Jul. 14, 2015 in PCT/JP2015/062385 (1 page).

* cited by examiner

*Primary Examiner* — Seth Dumbris
(74) *Attorney, Agent, or Firm* — Rothwell, Figg, Ernst & Manbeck, P.C.

(57) ABSTRACT

A connecting component material used as a material constituting a connecting component, wherein the connecting component material is obtained by using a Ni-plated metal plate in which a Ni plating layer is formed on the surface of a metal plate, and the average depth (R) of a surface roughness motif in at least one direction on the surface of the Ni plating layer is 1.0 μm or above, and by forming a Sn plating layer having a thickness of 0.3 to 5 μm on the Ni plating layer of the Ni-plated metal plate; the connection component material makes it possible to reduce friction and minimize abrasion of the material when a connecting component such as an electrical connection terminal is fitted, and to improve the reliability of a stable electrical connection; and the connecting component material can be used in e.g., electrical contact components such as lead frames, harness plugs, and connectors used in electrical and electronic devices and the like.

4 Claims, No Drawings

CONNECTING COMPONENT MATERIAL

CROSS REFERENCE TO RELATED APPLICATION

This application is a 35 U.S.C. 371 National Phase Entry Application from PCT/JP2015/062385, filed Apr. 23, 2015, which claims priority to Japanese Patent Application No. 2014-103080, filed May 19, 2014, the disclosures of which are incorporated herein in their entirety by reference.

TECHNICAL FIELD

The present invention relates to a connecting component material. More specifically, the present invention relates to a material for a connecting member which can be suitably used in, for example, electrical contact members such as a connector, a lead frame and a harness plug, which are used in an electrical instrument, an electronic instrument, and the like. The material for a connecting member of the present invention makes it possible to reduce friction and suppress abrasion of a material, for example, when a connecting part such as an electrical connecting terminal is fitted to another connecting part. Therefore, the material for a connecting member of the present invention can increase reliability of stable electrical connection.

BACKGROUND ART

The number of connecting terminals which are used in an automobile, a mobile phone and the like tends to be increased in accordance with increase of the number of electronic control devices to be used therein. It has been required for the connecting terminal to be miniaturized and lightened from the viewpoint of improvement in fuel efficiency of an automobile, space saving, portability of a mobile phone and the like. In order to respond to these requirements, it is necessary that the connecting terminal is prevented from deformation due to force (insertion force) which is applied when the connecting terminal is fitted to another connecting terminal, and that contact pressure between the connecting terminals at their connected portion is maintained. Accordingly, it has been required for a material which has hitherto been used in connecting terminals to use a material having a strength higher than conventional copper alloys. In addition, it has been required for a material used in a connecting terminal which is used under high temperature environment such as an engine room of an automobile to use a material which is excellent in stress relaxation resistance in order to suppress lowering of contact pressure between the connecting terminals at their connected portion due to heating with the passage of time.

In recent years, it has been investigated to develop a copper alloy by adding various metals to a copper alloy in order to increase mechanical strength of a connecting terminal, and improve stress relaxation resistance of the connecting terminal. However, a copper alloy which can be applied to a miniaturized connecting terminal has not yet been developed at the present time.

On the other hand, a stainless steel plate is suitable from the viewpoint of miniaturization, lightening and reduction in cost, since the stainless steel plate has mechanical strength higher than a copper alloy, and is excellent in stress relaxation resistance, small in specific gravity and inexpensive. As an electrical contact member formed of a stainless steel plate, there has been proposed an electrical contact member made of a stainless steel, in which a Ni plating layer is formed on a stainless steel plate which is used as a base material, and an Au plating layer is partially formed on the Ni plating layer (see, for example, Patent Literature 1). According to the electrical contact member, however, the Au plating layer is abraded by repeated fine sliding at the contact portion of a connecting terminal of the electrical contact member, and the stainless steel which is used as a base material is exposed to the outside surface. Therefore, when the stainless steel is oxidized, there is a possibility that a contact resistance between the connecting terminals is increased at the contact portion.

As an electric conductive material for a connecting member, which has low coefficient of friction, and which can maintain reliability of electrical connection, there has been proposed an electric conductive material for a connecting member, in which a Ni coating layer having an average thickness of 3.0 μm or less, a Cu—Sn alloy coating layer having a mean thickness of 0.2 to 3.0 μm and a Sn coating layer are formed on the surface of a Cu plate which is used as a base material in this order; a diameter of a maximum inscribed circle of the Sn coating layer is 0.2 μm or less in a cross section perpendicular to the surface of the above-mentioned material; a diameter of a minimum inscribed circle of the Sn coating layer is 1.2 to 20 μm in a cross section perpendicular to the surface of the above-mentioned material; and the highest difference between the outermost point of the material and the outermost point of the Cu—Sn alloy coating layer is 0.2 μm or less (see, for example, Patent Literature 2). In addition, as an electric conductive material for a connecting member, which corresponds to miniaturization of a terminal, and which is low in insertion force and excellent in electrical reliability, there has been proposed a copper plate for a connecting member, in which a Cu—Sn alloy coating layer, and a Sn or Sn-alloy coating layer is formed on the outermost surface of the copper plate; an arithmetic average roughness Ra is 0.5 μm or more and 4.0 μm or less in a direction parallel to a sliding direction at connection; a mean distance RSm between a valley depth and a peak height of the copper plate is 0.01 mm or more and 0.3 mm or less in the direction as mentioned above; a skewness Rsk is less than 0; and a peak height of the convex portion Rpk is 1 μm or less (see, for example, Patent Literature 3). However, there is a possibility in the above-mentioned electric conductive material for a connecting member and the above-mentioned copper plate for a connecting member that contact resistance increases at the connected portion when sliding between connecting members is repeated.

In recent years, therefore, there has been desired to develop a material for a connecting member which is small in coefficient of friction, and which can suppress increase in contact resistance even when fine sliding of the connecting member is repeated.

PRIOR ART LITERATURES

Patent Literatures

Patent Literature 1: Japanese Patent Unexamined Publication No. 2004-300489

Patent Literature 2: Japanese Patent Unexamined Publication No. 2007-258156

Patent Literature 3: Japanese Patent Unexamined Publication No. 2011-204617

SUMMARY OF THE INVENTION

Problems to be Solved by the Invention

The present invention has been made in view of the above-mentioned prior arts. An object of the present invention is to provide a material for a connecting member, which is small in coefficient of friction, and which can suppress increase in contact resistance even when fine sliding of a connecting member is repeated.

Means for Solving the Problems

The present invention relates to:

(1) a material for a connecting member used as a raw material of a connecting member, which includes a Ni-plated metal plate in which a Ni plating layer formed on a surface of a metal plate, and a mean depth R of roughness motif is 1.0 μm or more in at least one direction on the surface of the Ni plating layer, and a Sn plating layer having a thickness of 0.3 to 5 μm is formed on the Ni plating layer of the Ni-plated metal plate; and (2) the material for a connecting member according to the item (1), in which mean width RSm of a valley depth and a peak height existing on the surface of the Ni plating layer is more than 0 μm and 200 μm or less in the same direction as the direction of the mean depth R of the roughness motif of the surface of the Ni plating layer formed on the Ni-plated metal plate.

In the present description, a base material which is used in the material for a connecting member according to the present invention is a metal plate. A Ni-plated metal plate includes the metal plate on which a Ni plating layer is formed, and has a predetermined mean depth R of a roughness motif. The material for a connecting member includes the Ni-plated metal plate on which a Sn plating layer having a predetermined thickness is formed.

Effects of the Invention

According to the present invention, there can be obtained a material for a connecting member, which is small in coefficient of friction, and which can suppress increase in contact resistance even when fine sliding of a connecting member is repeated.

MODE FOR CARRYING OUT THE INVENTION

As described above, the material for a connecting member of the present invention is a material which is used as a raw material of a connecting member. The material for a connecting member includes a Ni-plated metal plate in which a Ni plating layer is formed on a surface of a metal plate, and a mean depth R of roughness motif is 1.0 μm or more in at least one direction on the surface of the Ni plating layer, and a Sn plating layer having a thickness of 0.3 to 5 μm is formed on the Ni plating layer of the Ni-plated metal plate.

Examples of the metal plate include, for example, a stainless steel plate, a copper plate, a copper alloy plate and the like, and the present invention is not limited only to those exemplified ones. Among the metal plates, a stainless steel plate is preferred from the viewpoint of lowering in coefficient of friction, and suppression of increase in contact resistance even when fine sliding of a connecting member is repeated. Therefore, the stainless steel plate is suitably used as a base material for the material for a connecting member in the present invention.

Examples of the stainless steel plate include, for example, a plate of austenitic stainless steel such as SUS301, SUS304 and SUS316; a plate of ferritic stainless steel such as SUS430, SUS430LX and SUS444; and a plate of martensitic stainless steel such as SUS410 and SUS420, all of which are prescribed in JIS, and the present invention is not limited only to those exemplified ones.

The thickness, length and width of the metal plate are not particularly limited, respectively, and can be appropriately adjusted in accordance with the kind of the metal plate, a production scale and the like. For example, when a stainless steel plate is used as the metal plate, its thickness is usually preferably 50 μm to 0.5 mm or so.

The mean depth R of a roughness motif is 1.0 μm or more in at least one direction on the surface of the Ni plating layer of the Ni-plated metal plate. The reason why the material for a connecting member of the present invention, which satisfies the above condition, can suppress increase in contact resistance even when fine sliding of a connecting member is repeated, is supposed to be based on that even though a Sn plating layer existing at the contact point of the connecting member is removed due to plastic flow at the time of repeating of fine sliding of a connecting member, Sn remains in the concave portion existing on the surface of the metal plate on which the Ni plating layer is formed. Since Sn remaining in the concave portion improves lubricity in fine sliding, abrasion of the Ni plating layer existing under the Sn plating layer is prevented by fine sliding. Therefore, exposure of the metal plate to the outside surface can be prevented, and increase in contact resistance caused by oxidation of the metal plate can be suppressed. Furthermore, even though fine sliding is repeated, since Sn remaining in the concave portion acts as a conductive path, initial contact resistance can be considered to be maintained.

Incidentally, the tem "at least one direction" is intended to mean at least one direction of a longitudinal direction (direction of rolling) of the metal plate and a direction vertical to the longitudinal direction (direction of rolling) of the metal plate (width direction).

The mean depth R of a roughness motif on the surface of the Ni plating layer formed on the Ni-plated metal plate is intended to mean a mean depth R of a roughness motif which is prescribed in ISO 12085 (1996). The mean depth R of a roughness motif can be determined in accordance with ISO 12085 (1996) by using a contact roughness meter manufactured by Tokyo Seimitsu Co., Ltd. under the trade name of SURFCOM 1400B. In the present invention, the mean depth R of a roughness motif on the surface of the above-mentioned metal plate is a value as determined by using a contact roughness meter manufactured by Tokyo Seimitsu Co., Ltd. under the trade name of SURFCOM 1400B.

The mean depth R of a roughness motif on the surface of the Ni plating layer formed on the Ni-plated metal plate is 1.0 μm or more, preferably 1.1 μm or more, from the viewpoint of remaining of Sn in the concave portion existing on the surface even when the Sn layer is removed by sliding due to plastic flow, and suppression of increase in contact resistance even when fine sliding of a connecting member is repeated. The mean depth R of a roughness motif is preferably 8 μm or less since there is a tendency that preparation of the mean depth R comes to be difficult in accordance with increase in the mean depth R.

In addition, the lower limit of the mean width RSm of a valley depth and a peak height existing on the surface of the Ni plating layer of the Ni-plated metal plate is preferably more than 0 μm, more preferably 0.005 μm or more, even more preferably 0.01 μm or more, further preferably 10 μm or more, even further preferably 30 μm or more, particularly preferably 50 μm or more, and its upper limit is preferably 200 μm or less, more preferably 150 μm or less, even more preferably 100 μm or less, from the viewpoint of remaining of Sn in the concave portion existing on the surface even when the Sn layer is removed by sliding due to plastic flow, and suppression of increase in contact resistance even when fine sliding of a connecting member is repeated, as well as mentioned above.

The mean width RSm of a valley depth and a peak height existing on the surface of the Ni plating layer is intended to mean a mean width RSm of a valley depth and a peak height which is prescribed in JIS B0601-1994. The mean width RSm of a valley depth and a peak height can be determined in accordance with JIS B0601-1994 by using a contact roughness meter manufactured by Tokyo Seimitsu Co., Ltd. under the trade name of SURFCOM 1400B. In the present invention, the mean width RSm of a valley depth and a peak height existing on the surface of the Ni plating layer of the Ni-plated metal layer is a value as determined by using a contact roughness meter manufactured by Tokyo Seimitsu Co., Ltd. under the trade name of SURFCOM 1400B.

The mean depth R of a roughness motif on the surface of the Ni plating layer of the Ni-plated metal plate and the mean width RSm of a valley depth and a peak height existing on the surface of the Ni plating layer of the Ni-plated metal plate can be easily controlled by, for example, roughening the surface of the metal plate by means of a member for roughening the surface, such as a work roll or a polishing belt each having a roughened surface, and carrying out a metal plating of its surface with Ni. After roughening of the surface of the metal plate, the metal plate can be cleaned by, for example, ultrasonic cleaning with a solvent as occasion demands, in order to remove residues such as polish scraps from the roughened surface of the metal plate. The metal plate can be subjected to a pretreatment such as degreasing or washing with an acid prior to carrying out Ni plating.

The plating of the metal plate with Ni can be carried out by any of an electroplating method and an electroless plating method. Examples of the electroplating method include, for example, an electroplating method using a sulfate bath, an electroplating method using a Watts bath, an electroplating method using a sulfamic acid bath and the like, and the present invention is not limited only to those exemplified ones.

The thickness of the Ni plating layer formed on the metal plate is 0.3 μm or more from the viewpoint of formation of the Ni plating layer along a concave portion and a convex portion being formed on the surface of the metal plate. The thickness of the Ni plating layer is 5 μm or less, preferably 4 μm or less, more preferably 3 μm or less, from the viewpoint of formation of a concave portion for remaining the Sn in the concave portion.

Next, Sn plating is carried out on the Ni plating layer of the Ni-plated metal plate obtained by formation of the Ni plating layer on the metal plate, to form a Sn plating layer. The Sn plating can be carried out by any of an electroplating method and an electroless plating method. Examples of the electroplating method include, for example, an electroplating method using a Sn plating bath such as a methanesulfonic acid bath, a Ferrostan bath, a halogen bath and the like, and the present invention is not limited only to those exemplified ones.

The thickness of the Sn plating layer formed on the Ni plating layer is 0.3 μm or more from the viewpoint of sufficient remaining of Sn which is removed by sliding due to plastic flow in the concave portion being formed on the Ni plating layer of the Ni-plated metal plate. On the other hand, since an oxide layer of Sn is formed by sliding, to increase contact resistance when the Sn plating layer is excessively thick, the thickness of the Sn plating layer is preferably 5 μm or less from the viewpoint of suppression of increase in contact resistance.

The material for a connecting member according to the present invention, which is obtained by forming the Sn plating layer on the Ni plating layer of the Ni-plated metal plate as described above, is small in coefficient of friction, and can suppress increase in contact resistance even when fine sliding of a connecting member is repeated.

EXAMPLES

Next, the present invention is more specifically described based on working examples. However, the present invention is not limited only to the examples.

Examples 1 to 9 and Comparative Examples 1 to 5

As a base material, a stainless steel plate (SUS430) was used. A roughening treatment was appropriately carried out on the surface of the stainless steel plate by using a work roll or a polishing belt each having a roughened surface, to give a stainless steel plate having a various surface roughness and a thickness of 0.2 mm.

A roughness motif mean depth R and a mean width RSm of a valley depth and a peak height of the stainless steel plate obtained in the above were determined by the following methods. The results are shown in the column of "Motif depth R" and "Mean width RSm" in Table 1, respectively.

[Methods for Determining Roughness Motif Mean Depth R and Mean Width RSm of a Valley Depth and a Peak Height]

A test piece having a length of 50 mm and a width of 50 mm was cut out from the stainless steel plate. The test piece was washed with acetone by using ultrasonic waves. Thereafter, a roughness motif mean depth R of the test piece was determined in accordance with ISO 12085 by using a contact roughness meter manufactured by Tokyo Seimitsu Co., Ltd. under the tradename of SURFCOM 1400B, and a mean width RSm of a valley depth and a peak height was determined in accordance with JIS B0601-1994.

Incidentally, when the roughness motif was determined, the upper limit length of the roughness motif was set to 0.5 mm. The roughness motif mean depth R and the mean width RSm of a valley depth and a peak height were determined three times, respectively, in a direction vertical to the direction of rolling of the test piece, and each average of the values was calculated.

Next, each of the test pieces was subjected to alkali degreasing and an acid washing treatment by a conventional method. Thereafter, Ni strike plating and Ni plating of each test piece were carried out based on the following conditions, to form a Ni plating layer on the test piece. The roughness motif mean depth R and mean width RSm of a valley depth and a peak height of the test piece on which the Ni plating layer was formed were determined in the same manner as described above. The results are shown in Table 1. Thereafter, Sn plating of the test piece was carried out under the following conditions to form a Sn plating layer on the Ni plating layer of the test piece, to give a test piece on which a Ni plating layer having a thicknesses shown in Table 1 was formed.

[Conditions for Ni Strike Plating]

Ni plating solution (Wood's bath): 240 g/L of nickel chloride and 125 mL/L of hydrochloric acid (pH: 1.2)

Temperature of plating solution: 35° C.

Current density: 8 A/$dm^2$

[Conditions for Ni Plating]

Ni plating solution (Watts bath): 300 g/L of nickel sulfate, 45 g/L of nickel chloride and 35 g/L of boric acid (pH: 3.9)

Temperature of Plating solution: 50° C.

Current density: 8 A/$dm^2$

[Conditions for Sn Plating]

Sn plating solution: 50 g/L of $Sn^{2+}$ and 120 mL/L of a free acid, commercially available from Uemura & Co., Ltd. under the trade name of TYNADES GHS-51 (pH: 0.2)

Anode: Sn plate

Temperature of solution: 35° C.

Current density: 10 A/$dm^2$

In addition, the thickness of the Ni plating layer and the thickness of the Sn plating layer were measured in accordance with the following method. The results are shown in Table 1.

[Method for Measuring Thickness of Ni Plating Layer and Thickness of Sn Plating Layer]

The thickness of the Ni plating layer and the thickness of the Sn plating layer were measured in accordance with the "Electrolytic Test Method" prescribed in JIS H8501 by using an electroplating thickness measuring instrument manufactured by Chuo Seisakusho, Ltd.

Next, as properties of the test piece on which the Sn plating layer was formed, which was obtained in the above, maximum contact resistance and coefficient of friction of the test piece during carrying out a fine sliding friction test were examined in accordance with the following methods. The results are shown in Table 1.

[Maximum Contact Resistance During Carrying out a fine Sliding Friction Test]

Simulating electric contact portions in a fitting-type coupling member, change of contact resistance between materials at the fine sliding portion was evaluated by using a sliding tester manufactured by Kabushikikaisha Yamasaki Seiki Kenkyusho.

First, a platy test piece (male test piece) was cut out from the test piece on which the Sn plating layer was formed, and the male test piece was fixed on a horizontal table. A semispherical test piece (female test piece having a diameter of 1.5 mm) was cut out from the same test piece on which the Sn plating layer was formed as mentioned above, and the female test piece was put on the male test piece, to contact the male test piece with the female test piece. Thereafter, a load of 2.0 N was applied to the female test piece by an elastic spring, to push the male test piece. A constant current was applied between the male test piece and the female test piece. The male test piece was slid in a horizontal direction (sliding distance: 50 μm, sliding frequency: 1.0 Hz) by using a stepping motor, and the maximum contact resistance was determined by a four-terminal method until the number of times of the sliding reached 2000 under the conditions of an open circuit voltage of 20 mV and a current of 10 mA. An acceptance criterion was set such that the maximum contact resistance was 100 mΩ or less until the number of times of the sliding reached 2000.

[Coefficient of Friction]

A test piece having a length of 40 mm and a width of 40 mm was cut out from the test piece on which the Sn plating layer was formed. Using a stainless steel ball having a diameter of 10 mm, coefficient of dynamic friction of the test piece was determined by means of a frictional wear tester manufactured by Rhesca Co., Ltd. under the conditions of a load of 4 N, a radius of 7.5 mm and a rotational speed of 12.7 rpm after the ball was rotated 50 times. An acceptance criterion was set such that the coefficient of dynamic friction was 0.3 or less.

Example 10

A test piece on which the formed Sn plating layer was formed was produced in the same manner as in Example 1, except that conditions for Ni plating employed in Example 1 were changed to the following conditions.

[Conditions for Ni Plating]

Ni plating solution (Watts bath+brightener): 300 g/L of nickel sulfate, 45 g/L of nickel chloride, 35 g/L of boric acid (pH: 3.9), 2 g/L of saccharin sodium and 0.2 g/L of 2-butyne-1,4-diol Temperature of plating solution: 50° C.

Current density: 8 A/$dm^2$

Next, as properties of the test piece on which the Sn plating layer was formed, which was obtained in the above, maximum contact resistance and coefficient of friction of the test piece during carrying out a fine sliding friction test were examined in the same manner as described above. The results are shown in Table 1.

Example 11

A test piece on which the formed Sn plating layer was formed was produced in the same manner as in Example 1, except that a copper alloy plate having a thickness of 0.2 mm manufactured by Kobe Steel, Ltd. under a product number of CAC60 was used in place of the stainless steel plate used in Example 1.

Next, as properties of the test piece on which the Sn plating layer was formed, which was obtained in the above, maximum contact resistance and coefficient of friction of the test piece during carrying out a fine sliding friction test were examined in the same manner as described above. The results are shown in Table 1.

Comparative Example 6

A test piece on which the formed Sn plating layer was formed was produced in the same manner as in Example 1, except that conditions for Ni plating employed in Example 1 were changed to the following conditions.

[Conditions for Ni Plating]

Ni plating solution (Watts bath): 300 g/L of nickel sulfate, 45 g/L of nickel chloride and 35 g/L of boric acid (pH: 3.9)

Temperature of plating solution: 50° C.

Current density: 2 A/$dm^2$

Next, as properties of the test piece on which the Sn plating layer was formed, which was obtained in the above, maximum contact resistance and coefficient of friction of the test piece during carrying out a fine sliding friction test were examined in the same manner as described above. The results are shown in Table 1.

Comparative Example 7

A test piece on which the formed Sn plating layer was formed was produced in the same manner as in Example 1, except that conditions for Ni plating employed in Example 1 were changed to the following conditions.

[Conditions for Ni Plating]

Ni plating solution (chloride bath): 300 g/L of nickel chloride and 35 g/L of boric acid (pH: 3.9)

Temperature of plating solution: 50° C.

Current density: 2 A/dm$^2$

Next, as properties of the test piece on which the Sn plating layer was formed, which was obtained in the above, maximum contact resistance and coefficient of friction of the test piece during carrying out a fine sliding friction test were examined in the same manner as described above. The results are shown in Table 1.

Comparative Example 8

A copper alloy plate having a thickness of 0.2 mm was used in place of the stainless steel plate, and a mold on which fine concavo-convex shapes were formed at a constant pitch was pushed on the surface of the copper alloy plate in accordance with a method described in Japanese Patent Unexamined Publication No. 2011-204617 so as to carry out a roughening treatment, to give a copper alloy plate having concavo-convex shapes. The roughness motif mean depth R and mean width RSm of the concavo-convex shapes of the obtained copper alloy plate having the concavo-convex shapes were determined in the same manner as described above. The results are shown in Table 1.

Next, Cu plating of the copper alloy plate having concavo-convex shapes obtained in the above was carried out under the following Cu plating conditions. Thereafter, Sn plating of the above Cu-plated plate was carried out in the same manner in Example 1, to give a test piece on which a Sn plating layer was formed. Thereafter, the test piece on which the Sn plating layer was formed, which was obtained in the above was subjected to a reflow treatment at a temperature of 280° C. for 10 seconds.

[Conditions for Cu Plating]

Cu plating solution (copper sulfate plating bath): 200 g/L of copper sulfate and 45 g/L of sulfuric acid Temperature of plating solution: 30° C.

Current density: 15 A/dm$^2$

Thickness of Cu plating layer: 0.15 μm

This copper alloy plate is not a plate having a surface on which a Ni plating layer is formed, but a plate having a surface on which a Cu plating layer is formed. Accordingly, the column of the Ni-plating layer described in Table 1 shows a thickness of the Cu plating layer, a motif depth R on the surface of the metal plate on which the Cu plating layer is formed, and the mean width RSm on the surface of the Cu plating layer.

Next, as properties of the test piece on which the Sn plating layer was formed, which was obtained in the above, maximum contact resistance and coefficient of friction of the test piece during carrying out a fine sliding friction test were examined in the same manner as described above. The results are shown in Table 1.

TABLE 1

| | Metal plate | | Ni plating layer | | | | | |
|---|---|---|---|---|---|---|---|---|
| Ex. and Comp. Ex. No. | Motif depth R (μm) | Mean width RSm (μm) | Thickness of Ni plating layer (μm) | Motif depth R (μm) | Mean width RSm (μm) | Thickness of Sn plating layer (μm) of Ni-plated metal plate on which Sn plating layer is formed | Maximum contact resistance (mΩ) | Coefficient of friction |
| Ex. 1 | 1.10 | 62 | 0.3 | 1.06 | 32 | 0.3 | 12 | 0.16 |
| Ex. 2 | 3.73 | 129 | 0.3 | 3.59 | 130 | 1.0 | 26 | 0.21 |
| Ex. 3 | 1.20 | 79 | 0.5 | 1.15 | 82 | 0.4 | 11 | 0.19 |
| Ex. 4 | 3.84 | 160 | 0.7 | 3.70 | 165 | 2.0 | 37 | 0.23 |
| Ex. 5 | 1.11 | 0.01 | 1.0 | 1.08 | 0.02 | 5.0 | 48 | 0.29 |
| Ex. 6 | 1.38 | 42 | 3.0 | 1.23 | 44 | 3.0 | 13 | 0.28 |
| Ex. 7 | 4.23 | 200 | 0.3 | 4.11 | 203 | 0.3 | 49 | 0.17 |
| Ex. 8 | 5.62 | 243 | 0.4 | 5.55 | 245 | 5.0 | 38 | 0.30 |
| Ex. 9 | 2.61 | 221 | 0.7 | 2.59 | 224 | 1.0 | 45 | 0.20 |
| Ex. 10 | 6.98 | 121 | 3.0 | 3.42 | 172 | 2.0 | 29 | 0.27 |
| Ex. 11 | 3.84 | 160 | 0.2 | 3.36 | 63 | 0.3 | 90 | 0.31 |
| Comp. Ex. 1 | 0.97 | 59 | 0.3 | 0.93 | 23 | 0.3 | 1600 | 0.43 |
| Comp. Ex. 2 | 0.75 | 70 | 0.3 | 0.72 | 72 | 1.0 | 1000 | 0.55 |
| Comp. Ex. 3 | 1.00 | 165 | 0.5 | 0.98 | 80 | 3.0 | 580 | 0.47 |
| Comp, Ex. 4 | 3.84 | 160 | 0.7 | 3.70 | 150 | 0.2 | 1430 | 0.23 |
| Comp. Ex. 5 | 1.21 | 38 | 1.0 | 1.10 | 40 | 5.3 | 230 | 0.67 |
| Comp. Ex. 6 | 1.20 | 79 | 3.0 | 0.98 | 88 | 1.0 | 210 | 0.51 |
| Comp. Ex. 7 | 1.20 | 79 | 1.0 | 0.74 | 98 | 2.0 | 320 | 0.55 |
| Comp. Ex. 8 | 1.27 | 80 | 0.15 | 1.25 | 81 | 1.0 | 190 | 0.35 |

From the results shown in Table 1, it can be seen that the test piece obtained in each example is small in coefficient of friction and suppressed in increase of maximum contact resistance even when fine sliding of a connecting member is repeated. Since a plate of a copper alloy which is softer than stainless steel is used as a base material in the test piece obtained in Example 11, it can be seen that the test piece is slightly higher in coefficient of friction and maximum contact resistance than the test pieces obtained in Examples 1 to 10.

On the contrary, the test piece obtained in each comparative example was large in coefficient of friction and increased in maximum contact resistance when fine sliding of a connecting member is repeated. In addition, since each test piece obtained in Comparative Examples 1 to 3, 6 and 7 had a small roughness motif mean depth R after the formation of a Ni plating layer, and Sn did not remain in the concave portion of the Ni plating layer, the Ni plating layer was abraded, and moreover a metal plate which was used as a base material was abraded. As a result, maximum contact resistance was increased. Since the test piece obtained in Comparative Example 4 did not have a Sn plating layer having a thickness sufficient for remaining Sn in the concave portion of the Ni plating layer, maximum contact resistance was increased. In addition, as to the test piece obtained in Comparative Example 5, although a Sn plating layer remained in the concave portion of a Ni plating layer, since the Sn plating layer was thick, an oxide of Sn was formed by fine sliding, and thereby maximum contact resistance was increased.

In addition, since a soft copper alloy plate was used as a base material in the test piece obtained by a conventional manner in Comparative Example 8, a Cu—Sn alloy layer which was a thin, hard and brittle film was easily abraded, and coefficient of friction of the test piece was increased after the Cu—Sn alloy layer was abraded. After the abrasion of the Cu—Sn alloy layer, maximum contact resistance was increased since the copper alloy plate was abraded when the number of times of sliding was increased.

INDUSTRIAL APPLICABILITY

The material for a connecting member of the present invention is expected to be used in, for example, electrical contact members such as a connector, a lead frame and a harness plug, which are used in an electrical instrument, an electronic instrument and the like.

The invention claimed is:

1. A material for a connecting member used as a raw material of a connecting member, comprising a Ni-plated metal plate in which a Ni plating layer is formed on a surface of a metal plate, and a mean depth R of a roughness motif is 1.0 μm or more in at least one direction on the surface of the Ni plating layer, and a Sn plating layer having a thickness of 0.3 to 5 μm formed on the Ni plating layer of the Ni-plated metal plate.

2. The material for a connecting member according to claim 1, wherein a mean width RSm of a valley depth and a peak height existing on the surface of the Ni plating layer is more than 0 μm and 200 μm or less in the same direction as the direction of the mean depth R of the roughness motif of the surface of the Ni plating layer.

3. The material for a connecting member according to claim 1, wherein the metal plate is a stainless steel plate.

4. The material for a connecting member according to claim 1, wherein the metal plate is a copper plate or a copper alloy plate.

* * * * *